United States Patent [19]
Ito et al.

[11] Patent Number: 5,509,264
[45] Date of Patent: Apr. 23, 1996

[54] DIRECT COAL FIRED TURBINE COMBINED POWER GENERATION SYSTEM

[75] Inventors: Seiya Ito, Kobe; Motoaki Hirao, Tokyo; Michihiro Shiraha, Kobe; Shunpei Nozoe, Urayasu; Kazuyoshi Kawamura, Kashiwa; Kenichi Fujii, Akashi; Eiichi Harada, Kakogawa; Tatsuo Ino, Tomisato; Masahiro Uozumi, Kobe; Tetsuo Abe, Tokyo, all of Japan

[73] Assignee: Kawasaki Jukogyo Kabushiki Kaisha, Kobe, Japan

[21] Appl. No.: 224,323

[22] Filed: Apr. 7, 1994

[30]     Foreign Application Priority Data

Jun. 18, 1993  [JP]  Japan ..................... 5-147191

[51] Int. Cl.$^6$ ................. F02C 3/28; F02C 6/18
[52] U.S. Cl. .................. 60/39.12; 60/39.182
[58] Field of Search ............. 60/39.12, 39.182, 60/39.464, 39.02

[56]           References Cited

U.S. PATENT DOCUMENTS 4,466,241  2/1900  Inui et al. ................ 60/39.182
4,901,521  8/1984  Schemenau et al. ................ 60/39.12
5,265,410  11/1993  Hisatome ................ 60/39.12

FOREIGN PATENT DOCUMENTS 64-44882  2/1989  Japan .

*Primary Examiner*—Louis J. Casaregola
*Attorney, Agent, or Firm*—Oliff & Berridge

[57]           ABSTRACT

A direct coal fired type gas turbine combined power generation system comprises a pressurized gasifier provided with a gas outlet, a gas cooling unit provided for the gas outlet of the pressurized gasifier, a high temperature dust collector unit connected through a line to a gas cooling unit, a gas turbine combustor connected through a line to the dust collector unit, a gas turbine connected through a line to the gas turbine combustor, a gas turbine generator connected through an output shaft to the gas turbine, a heat recovery boiler connected to the gas turbine, a gas refining unit disposed in association with the heat recovery boiler and connected through a line at an upstream side thereof to the gas cooling unit, a steam turbine connected through a line to a downstream side of the heat recovery boiler and the gas cooling unit through a line and a steam turbine generator connected through an output shaft to the steam turbine.

14 Claims, 2 Drawing Sheets

DIRECT COAL FIRED TURBINE COMBINED POWER GENERATION SYSTEM

BACKGROUND OF THE INVENTION

The present invention relates to a gas turbine combined power generation system, and more particularly, to a direct coal fired type gas turbine combined power generation system utilizing a pressurized gasifier provided with a gas refining equipment and a dust collecting equipment capable of preventing from lowering the thermal efficiency of the power generation system which is resulted through cooling a scrubbed raw gas for the utilization for the gas refining equipment.

FIG. 2 is a conventional system diagram showing a coal gas combined power generation system utilizing a pressurized entrained flow coal gasifier disclosed, for example, in the Japanese Patent Publication (KOKOKU) No. 44882/1989. In the illustrated conventional power generation system, a coal 101 is gasified in a gasifier 103 utilizing air or oxygen as an oxidant 102 and then exhausted as a raw gas 104 of high pressure and high temperature. The thus exhausted raw gas 104a enters a high temperature scrubber 105 in which unburned carbon content and an ash content are removed. The scrubbed raw gas 104b then enters a steam generation unit 106 to carry out a heat exchanging operation to reduce its temperature and further enters a gas/gas heat exchanger 107 in which a heat exchanging operation is performed between the scrubbed raw gas 104b and a clean gas 108. Through this operation, the scrubbed raw gas 104b is lowered in its temperature to a temperature required for a gas refining unit 109, in which the gas is refined for the purposes of corrosion prevention to the gas turbine and safeness of environment.

The clean gas 108 is heat-exchanged in the gas/gas heat exchanger 107 with the scrubbed raw gas 104b, thus increasing its temperature, the gas is fed to a gas turbine combustor 111 as a fuel gas 110 and then burned therein. The exhaust gas in high temperature state is transferred to a gas turbine 112 to perform its working, and then, in a gas turbine generator 113, is converted into an electric energy. Thereafter, the gas is exhausted as a gas turbine exhaust gas 114, in which a sensible heat is recovered in heat recovery boiler 115 to generate steam. Thereafter, the gas 114 is released in an atmosphere.

The prior art described above can provide a combined power generation plant with high thermal efficiency having a structure capable of reacting the coal and the oxidant in the gasifier, producing and refining a fuel by reducing a temperature of the generated gas, driving the gas turbine by a high temperature gas generated by the burning of the fuel gas, recovering the sensitive heat in the gasifier, the steam generator and the heat recovery boiler to thereby generate steam and driving the steam turbine to perform the power generation.

However, in such prior art, when the gas exhausted from the gasifier is fed to the gas turbine, there is utilized a system in which the once produced gas is cooled to a temperature required for the gas refining unit, then increased in its temperature by means of the gas/gas heat exchanger and further burned to feed the gas into the gas turbine for the purpose of removing alkali metal or the like affecting on the operation of the gas turbine and refining the gas to keep safeness of the environment and remove sulfur content for the prevention of corrosion to machineries of the system. In general, a temperature required for the refining unit is about 400° to 500° C. in a case of desulfurization-dry-process or about 100° C. in a case of desulfurization-wet-process for performing the desulfurization in a reducing gas.

For this purpose, in the power generation system of the prior art, the gas of high temperature exhausted from the gasifier is circulated through various heat exchangers to once cool the gas to considerably low temperature for the desulfurization and then the temperature of the gas is again raised through the heat exchanging operation and burning operation for driving the turbine. Thereafter, the gas from the turbine is again lowered through the heat exchanging operation to release it into atmosphere, thus involving complicated processes with considerable radiation heat loss at respective units or components, resulting in the lowering of the thermal efficiency.

SUMMARY OF THE INVENTION

An object of the present invention is to substantially eliminate defects or drawbacks encountered in the prior art and to provide a direct coal fired type gas turbine combined power generation system having a compact and improved structure capable of achieving high thermal efficiency.

This and other objects can be achieved according to the present invention by providing, in one aspect, a direct coal fired type gas turbine combined power generation system which comprises a gasifier, a gas refining equipment, a gas turbine, a gas turbine generator, a steam turbine, a steam turbine generator, a dust collecting unit, a gas turbine combustor and a heat recovery boiler, wherein the gasifier is composed of a pressurized gasifier, the gas refining equipment comprises at least one of a desulfurization unit or a combination of a desulfurization unit and a denitration unit, the dust collecting unit is composed of a high temperature dust collecting unit, the high temperature dust collecting unit is disposed between the gasifier and the gas turbine combustor, and the gas refining equipment is disposed on a downstream side of the heat recovery boiler.

In another aspect of the present invention, there is provided a direct coal fired type gas turbine combined power generation system which comprises a gasifier, a gas cooling unit, a gas refining equipment, a gas turbine, a gas turbine generator, a steam turbine, a steam turbine generator, a dust collecting unit, a gas turbine combustor and a heat recovery boiler, wherein the dust collecting unit is composed of a high temperature dust collecting unit, the gas cooling unit is arranged between an output port of the gasifier and the high temperature dust collecting unit, the gas refining equipment comprises at least one of a desulfurization unit or a combination of a desulfurization unit and a denitration unit, the high temperature dust collecting unit is disposed between the gasifier and the gas turbine combustor, and the gas refining equipment is disposed on a downstream side of the heat recovery boiler.

In preferred embodiments of both the aspects, a pressurized gasifier is provided with an outlet port to which a gas cooling unit is connected.

The pressurized gasifier is a pressurized coal partial combustor, a pressurized entrained flow type, a horizontal cylindrical combustor, or a pressurized fluidized bed furnace. The pressurized gasifier comprises a precombustor, a combustor, a gasifier and a gas cooler which are disposed in a pressurized vessel or have a pressure-proof structures.

The high temperature dust collecting unit, operated in a high temperature condition, comprises at least either one of a cyclone dust collector and a ceramic filter.

An unburned char captured in the high temperature dust collecting unit is returned through a char returning means to the pressurized gasifier in which the char is gasified.

A scrubbed raw gas gasified in the pressurized gasifier is cooled in a gas cooling unit connected downstream side of the pressurized gasifier to a temperature of about 700° C., the scrubbed raw gas is then subjected to dust removing and alkali removing treatments in the high temperature dust collecting unit connected to the gas cooling unit and thereafter fed to the gas turbine combustor.

The heat recovery boiler is connected through a line to the gas turbine and the gas refining unit comprises a desulfurization unit connected to a downstream side of the heat recovery boiler. The heat recovery boiler may include first and second heat recovery boilers connected in series through a line, and the gas refining unit comprises a denitration unit incorporated on a way of the line connecting the first and second heat recovery boilers and a desulfurization unit connected to a downstream side of the second heat recovery boiler.

In an more concrete aspect, there is provided a direct coal fired type gas turbine combined power generation system which comprises:

a pressurized gasifier provided with a gas outlet;

a gas cooling unit provided for the gas outlet of the pressurized gasifier;

a high temperature dust collector unit connected through a line to a gas cooling unit;

a gas turbine combustor connected through a line to the dust collector unit;

a gas turbine connected through a line to the gas turbine combustor;

a gas turbine generator connected through an output shaft to the gas turbine;

a heat recovery boiler connected to the gas turbine;

a gas refining unit disposed in association with the heat recovery boiler and connected through a line at an upstream side thereof to the gas cooling unit;

a steam turbine connected through a line to a downstream side of the heat recovery boiler and the gas cooling unit through a line; and a steam turbine generator connected through an output shaft to the steam turbine.

As described above according to the present invention, the scrubbed raw gas exhausted from the pressurized gasifier is transferred to the gas turbine combustor and then to the gas turbine in a relatively high temperature state thereby carrying out power generating operation, an extremely high net thermal efficiency such as 45%. In addition, units or components of the system can be made simple or compact by adopting the pressurized gasifier, resulting in the easy operation or control of the system. Furthermore, it is not necessary to remove substance such as $H_2S$ or COS in a reducing area at the gas turbine inlet portion, and such substance can be removed in a low temperature area on the downstream side of the heat recovery boiler, thus reducing operational cost for the removal of such substance.

The further natures and features of the present invention will be made more clear from the following description made with reference to the accompanying drawings.

DESCRIPTION OF THE PREFERRED EMBODIMENT

Figure 1:
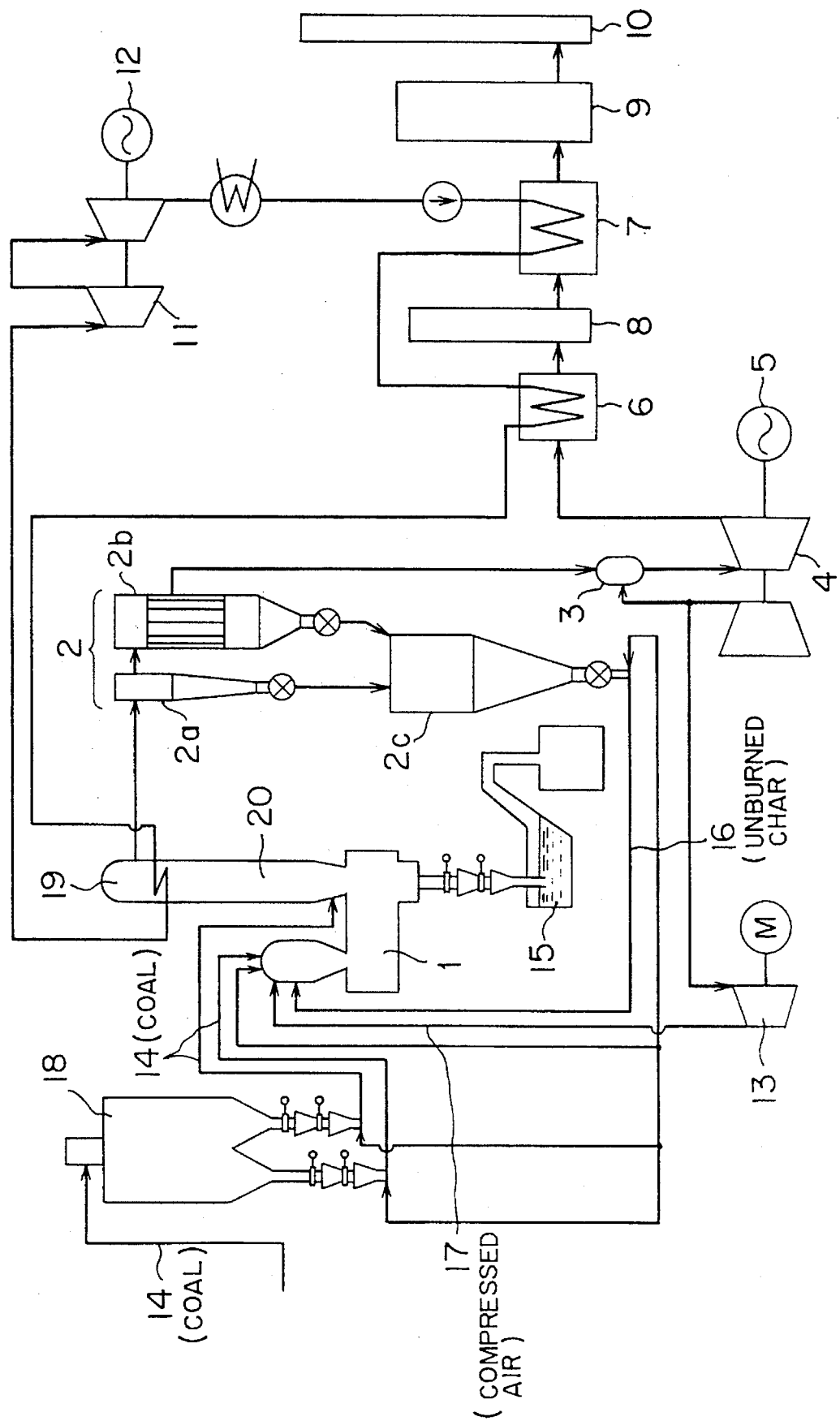
FIG. 1 is a system diagram of a direct coal fired type gas turbine combined power generation system utilizing a pressurized gasifier according to the present invention.
Figure 2:
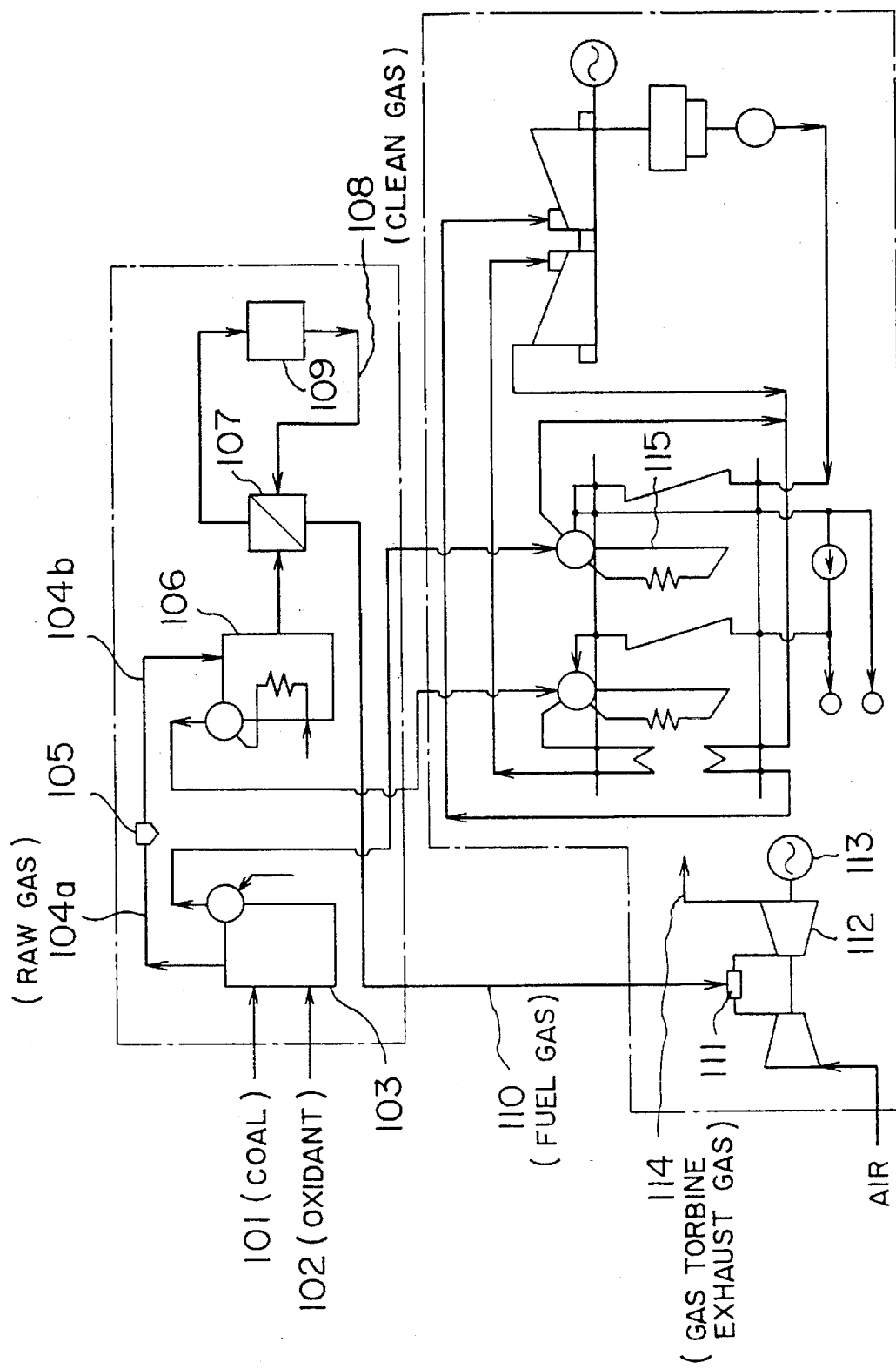
FIG. 2 is a system diagram representing a conventional coal gas utilizing combined power generation system.

FIG. 1 represent one embodiment of a system diagram of a direct coal fired type gas turbine combined power generation system according to the present invention.

Referring to FIG. 1, the combined power generation system generally comprises a pressurized coal partial combustor (gasifier) 1, which may be called pressurized CPC hereinafter, a gasifying reactor 20, a high temperature dust collector unit 2 connected through a line to a gas cooling unit 19 connected to the pressurized CPC 1, a gas turbine combustor 3 connected through a line to the dust collector unit 2, a gas turbine 4 connected through a line to the gas turbine combustor 3, a gas turbine generator 5 connected through an output shaft to the gas turbine 4, and heat recovery boilers 6 and 7, as heat exchanger unit and for recovering waste heat, connected to the gas turbine 4. The power generation system further comprises a denitration unit 8, a desulfurization unit 9 and a stack 10. In the illustrated system, the denitration unit 8 is disposed in a line connecting the heat recovery boilers 6 and 7 and the desulfurization unit 9 is connected to the downstream side heat recovery boiler 7. The stack 10 is connected to the desulfurization unit 9. The power generation system still further comprises a steam turbine 11 and a steam turbine generator 12 connected through an output shaft to the steam turbine 11 incorporated in a line connecting the heat recovery boilers 6, 7 and the pressurized CPC 1. Further, in FIG. 1, reference numeral 13 denotes a compressor, 14 represents a coal or line for transferring the coal, 15 is a slug discharging unit, 16 is a flow of unburned char, 17 is a flow of compressed air, and 18 is a pulverized coal bunker.

The gas turbine combined power generation system of the structure described above will operates as follows.

First, the coal 14 stored in the pulverized coal bunker 18 and the compressed air 17 as an oxidant fed from the compressor 13 are transferred into the pressurized CPC (coal partial combustor) 1, which generally comprises a precombustor, a combustor and a reductor. In the precombustor, the coal 14 is floated and burned by the compressed air 17 and then fed into the combustor at high speed in a tangential direction, in which the coal 14 is burned and almost ash content in the coal is captured by a combustor wall in a high temperature reduction atmosphere (about 1600° C.), the captured ash content then being exhausted from the combustor as a fused slug. The gasifying reaction is completed in the gasifying reactor 20, at a temperature of about 1300° C., disposed downstream side of the combustor, and thereafter, the gas is fed from the gasifying reactor 20 into the gas cooling unit 19, generally composed of an evaporator or superheater, in which an heat exchanging operation is performed to reduce the temperature of the gas to a temperature of about 700° C., which is then exhausted from the gas cooling unit 19 as a raw gas.

In the present embodiment, the pressurized CPC 1 is utilized as a gasifier and the pressurized CPC 1 is operated with a pressure about 15 to 30 $Kg/cm^2$ thereby making activate and improve the gasifying reaction in the pressurized CPC and also make compact the system itself.

The pressurized CPC in which a horizontal combustor is utilized can further provide or attain the following features or characteristic functions.

That is, a temperature at a slag tap port can be highly maintained by a swirling high temperature gas thereby eliminating a fear of clogging of the slag tap port with a cooled slug. The use of horizontal combustor makes easy the draw-out of the slug in comparison with a vertically equipped entrained flow coal gasifier. Since the ash content in the coal can be exhausted in a state of slug, the treatment thereof can be made easy in comparison with a fly ash state, the ash content in the slug state will retain its inherent effective usage in future. Furthermore, almost ash content in the coal (about more than 80%) can be fused and removed in the pressurized CPC, and accordingly, the possibility of causing trouble by the remaining ash content in units or equipments disposed on downstream side of the pressurized CPC can be effectively eliminated, which may result in a compact structure of the dust collecting unit.

The raw gas of the temperature of about 700° C. from the gas cooling unit 19 contains chlorine (Cl) in the form of HCl, or NaCl and KCl which are formed through reactions of chlorine (Cl) in the coal with alkali metal such as Na and K. Such alkali chloride reacts with $SO_2$ gas and produces alkali sulfate in accordance with the following formula 1.

(Formula 1)

$$2NaCl + SO_2 + H_2O + 1/2O_2 \leftrightarrows Na_2SO_4 + 2HCl$$

Such alkali sulfate is condensed on a metal surface, which may destroy a protection oxide film or obstruct the formation of the protection oxide film, through the reaction shown by the following formula 2, and then, cause corrosion of the metal surface.

(Formula 2)

$$Na_2SO_4 + Cr_2O_3 \rightarrow 3Na_2CrO_4 + 2SO_3$$

In general, it is said that, in a gas turbine, the allowance of concentration of alkali metal in a combustion gas for preventing corrosion of turbine blade is within a range of 0.02 to 0.04 ppm, and assuming that the alkali metal is removed to a value of an extent of such allowance by means of an alkali getter, for example, the $SO_2$ concentration consumed for the reaction of the formula 1 is a minute amount of such as 0.01 to 0.02 ppm. Accordingly, in order to reduce the $SO_2$ concentration to such value in the desulfurization unit, a desulfurizing ratio of more than 99.99% will be required in an assumption of the desulfurization in a state of scrubbed raw gas. Achieving of such desulfurizing ratio of more than 99.99% is substantially impossible in practice.

In view of this fact, according to the present invention, the desulfurization is not performed at this stage and the high temperature dust collecting unit 2 is arranged in this position, i.e. a position on the downstream side of the gas cooling unit 19. The element Na and K provide vapour state in a high temperature environment, but in an environment under 700° C. temperature, provide a solid state, whereby almost parts of Na and K can be captured or collected by the dust collecting unit 2 arranged at that position. The high temperature dust collecting unit 2 of this embodiment has a structure of the combination of a cyclone dust collector or separator 2a, and a ceramic filter 2b, and the captured Na and K are returned to the precombustor of the pressurized CPC 1 together with the unburned char or fly ash by the compressed air 17 via char bin 2d. The most part of the returned components is collected in the combustor and exhausted as a slug through the slug exhaust unit 15. Granular filters are also used for filtering gases by packing granular particles such as ceramics, which have proper grain size distributions therein respectively, in a support frame comprising a perforated plate or a wire screen.

According to the described arrangement of this embodiment, the location or arrangement of a char burning furnace or oxidizing furnace can be eliminated, thus making compact the power generation system, resulting in easy operation and control thereof. Furthermore, almost all ash content will be treated as slug including substantially no unburned content, thus achieving the high combustion coefficient, being advantageous.

The raw gas from which Na, K, fly ash and unburned char are collected and removed is then fed as a fuel gas to the gas turbine combustor 3, in which the fuel gas is mixed with air and then burned. Thereafter, the gas, increased in its temperature to about 1300° C., is fed into the gas turbine 4 to carry out the power generating operation.

The gas working in the gas turbine 4 is then subjected to the heat exchanging operation through the heat recovery boiler 6 disposed in an exhaust gas line connected to the gas turbine 4. Thereafter, in accordance with a value prescribed in an environmental criteria, it may be required to reduce the nitrozen oxide content in the gas through the denitration unit 8, and the heat exchanging operation will be further performed in the other heat recovery boiler 7 till a temperature of the gas reaches a predetermined value. The oxide sulfate content in the gas is thereafter removed in the desulfurization unit 9 till the content reaches a prescribed value and the thus cleaned gas is discharged through the stack 10. In this arrangement, in the case where the gas includes low content of nitrozen oxide and the denitration unit 8 is not needed, the heat recovery boilers 6 and 7 may be integrated as one unit to which the desulfurization unit 9 is connected to its downstream side.

Further, referring to FIG. 1, the steam from the steam turbine 11 is condensed and the condensed water is subjected to the heat exchanging operation in the waste heat recovery boiler 7 or 6 to be increased in its temperature or to be evaporated. Thereafter, it is evaporated or superheated in the gas cooling unit 19 disposed downstream side of the pressurized CPC 1. However, these arrangement is optional which can be selected or changed in accordance with operational conditions or requirements for the power generation system. It is of course to be noted that a pressurized fluidized bed furnace or pressurized entrained flow coal gasifier as a pressurized gasifier may be utilized in place of the pressure CPC.

As described above according to the present invention, the scrubbed raw gas exhausted from the pressurized gasifier is transferred to the gas turbine combustor and then to the gas turbine in a relatively high temperature state thereby carrying out power generating operation, an extremely high net thermal efficiency such as 45%. In addition, units or components of the system can be made simple or compact by adopting the pressurized gasifier, resulting in the easy operation or control of the system. Furthermore, it is not necessary to remove substance such as $H_2S$ or COS in a reducing area at the gas turbine inlet portion, and such substance can be removed in a low temperature area on the downstream side of the heat recovery boiler, thus reducing operational cost for the removal of such substance.

What is claimed is:

1. In a direct coal fired turbine combined power generation system comprising a gasifier, a gas refining equipment, a gas turbine, a gas turbine generator, a steam turbine, a steam turbine generator, a dust collecting unit, a gas turbine combustor and a heat recovery boiler, wherein the gasifier is composed of a pressurized gasifier, the gas refining equipment comprises at least one of a desulfurization unit or a combination of a desulfurization unit and a denitration unit, the dust collection unit is composed of a high temperature dust collection unit treating a raw gas of a temperature lower than about 700° C. and having an alkali removing function, the high temperature dust collecting unit is disposed between the gasifier and the gas turbine combustor, and thus the gas refining equipment is disposed on a downstream side of the heat recovery boiler.

2. The direct coal fired turbine combined power generation system according to claim 1, wherein said pressurized gasifier is provided with an outlet port to which a gas cooling unit is connected.

3. The direct coal fired type gas turbine combined power generation system according to claim 1, wherein said pressurized gasifier is a pressurized coal partial combustor.

4. The direct coal fired type gas turbine combined power generation system according to claim 1, wherein said pressurized gasifier is a pressurized entrained flow coal gasifier.

5. The direct coal fired type gas turbine combined power generation system according to claim 1, wherein said pressurized gasifier is a horizontal cylindrical combustor.

6. The direct coal fired type gas turbine combined power generation system according to claim 1, wherein said pressurized gasifier is a pressurized fluidized bed furnace.

7. The direct coal fired turbine combined power generation system according to claim 1, wherein said high temperature dust collecting unit, operated in a high temperature condition lower than 700° C., comprises at least either one of a cyclone dust collector and a ceramic filter installed at a downstream side thereof.

8. The direct coal fired turbine combined power generation system according to claim 1, wherein said pressurized gasifier comprises a precombustor, a combustor, a gasifying reactor and a gas cooler which are all installed in a pressure vessel.

9. The direct coal fired turbine combined power generation system according to claim 1, wherein said pressurized gasifier comprises a precombustor, a combustor, a gasifying reactor and a gas cooler, wherein each element has pressure-proof structures.

10. The direct coal fired turbine combined power generation system according to claim 1, wherein an unburned char captured in the high temperature dust collecting unit is returned through a char returning means to the pressurized gasifier in which the char is gasified, whereby alkali is removed from the raw gas.

11. The direct coal fired turbine combined power generation system according to claim 1, wherein a scrubbed raw gas gasified in the pressurized gasifier is cooled in a gas cooling unit connected downstream side of the pressurized gasifier to a temperature of about 700° C., the scrubbed raw gas is then subjected to dust removing and alkali removing treatments in the high temperature dust collecting unit connected to the gas cooling unit and thereafter fed to the gas turbine combustor.

12. The direct coal fired turbine combined power generation system according to claim 1, wherein a upstream side of the heat recovery heat boiler is connected through a line to the gas turbine and the gas refining unit comprises a desulfurization unit connected to a downstream side of a downstream side of the heat recover boiler.

13. The direct coal fired type gas turbine combined power generation system according to claim 12, wherein said heat recovery heat boiler includes first and second heat recovery boilers connected in series through a line, and the gas refining unit comprises a denitration unit incorporated on a way of the line connecting the first and second heat recovery boilers and a desulfurization unit connected to a downstream side of the second heat recovery boiler.

14. A direct coal fired turbine combined power generation system comprising:

a pressurized gasifier provided with a gas outlet;

a gas cooling unit provided at the gas outlet of the pressurized gasifier;

a high temperature dust collector unit treating a raw gas of a temperature lower than about 700° C., having an alkali removing function, and connected through a line to the gas cooling unit;

a gas turbine combustor connected through a line to the dust collector unit;

a gas turbine connected through a line to the gas turbine combustor;

a gas turbine generator connected through an output shaft to the gas turbine;

a heat recovery boiler connected to the gas turbine;

a gas refining unit connected through a line to a downstream side of the heat recovery boiler;

a stream turbine connected through a line to a downstream side of the heat recovery boiler and the gas cooling unit through a line; and a steam turbine generator connected through an output shaft to the stream turbine.

* * * * *